US010348400B2

(12) United States Patent
Topsu

(10) Patent No.: US 10,348,400 B2
(45) Date of Patent: Jul. 9, 2019

(54) METHOD FOR IDENTIFYING A DEVICE CAPABLE OF COMMUNICATING BY LI-FI

(71) Applicant: OLEDCOMM, Velizy, Villacoublay (FR)

(72) Inventor: Suat Topsu, Versailles (FR)

(73) Assignee: OLEDCOMM, Velizy, Villacoublay (FR)

( * ) Notice: Subject to any disclaimer, the term of this patent is extended or adjusted under 35 U.S.C. 154(b) by 0 days.

(21) Appl. No.: 15/737,842

(22) PCT Filed: Jul. 18, 2016

(86) PCT No.: PCT/EP2016/067081
§ 371 (c)(1),
(2) Date: Dec. 19, 2017

(87) PCT Pub. No.: WO2017/013078
PCT Pub. Date: Jan. 26, 2017

(65) Prior Publication Data
US 2018/0351642 A1 Dec. 6, 2018

(30) Foreign Application Priority Data

Jul. 23, 2015 (FR) ...................... 15 57029

(51) Int. Cl.
*H04B 10/11* (2013.01)
*H04W 4/80* (2018.01)
(Continued)

(52) U.S. Cl.
CPC ........... *H04B 10/11* (2013.01); *H04B 10/116* (2013.01); *H04B 10/80* (2013.01);
(Continued)

(58) Field of Classification Search
CPC ..................................................... H04B 10/11
See application file for complete search history.

(56) References Cited

U.S. PATENT DOCUMENTS 10,085,230 B2 * 9/2018 Alles ...................... H04W 64/00
2008/0178278 A1 * 7/2008 Grinstein ............ H04L 63/0227
726/12
(Continued)

FOREIGN PATENT DOCUMENTS

FR    3 014 619 A1    6/2015
WO    2014/085124 A1    6/2014
WO    2014/085128 A1    6/2014

OTHER PUBLICATIONS

International Search Report of PCT/EP2016/067081 dated Sep. 28, 2016 [PCT/ISA/210].

*Primary Examiner* — Nathan M Cors
(74) *Attorney, Agent, or Firm* — Sughrue Mion, PLLC

(57) ABSTRACT

A method for identifying a device capable of communicating by Li-Fi including the steps of generating and storing a list of first pieces of address data and a list of transmission frequencies each associated with a first piece of address data; selecting second pieces of address data (11) to form a MAC address (10); transforming each second piece of address data into a third piece of address data containing a transmission frequency value associated with the second piece of address data; generating a global address; assigning the global address to the device; and recording the global address in a memory module of the device capable of communicating by Li-Fi.

8 Claims, 1 Drawing Sheet

(51) Int. Cl.
*H04B 10/116* (2013.01)
*H04L 29/12* (2006.01)
*H04B 10/80* (2013.01)
*H04L 29/08* (2006.01)

(52) U.S. Cl.
CPC ...... *H04L 61/2038* (2013.01); *H04L 61/6004* (2013.01); *H04L 61/6022* (2013.01); *H04W 4/80* (2018.02); *H04L 69/324* (2013.01)

(56) References Cited

U.S. PATENT DOCUMENTS

| | | | | |
|---|---|---|---|---|
| 2008/0262901 | A1* | 10/2008 | Banga | G06Q 10/06375 705/14.53 |
| 2010/0106774 | A1* | 4/2010 | Thomson | H04W 4/02 709/203 |
| 2015/0223277 | A1* | 8/2015 | Jovicic | H04W 76/14 455/41.2 |
| 2018/0192253 | A1* | 7/2018 | Khan | G01S 5/0236 |

* cited by examiner

METHOD FOR IDENTIFYING A DEVICE CAPABLE OF COMMUNICATING BY LI-FI

CROSS REFERENCE TO RELATED APPLICATIONS

This application is a National Stage of International Application No. PCT/EP2016/067081, filed Jul. 18, 2016, claiming priority based on French Patent Application No. 15 57029, filed Jul. 23, 2015, the contents of all of which are incorporated herein by reference in their entirety.

The invention relates to the field of identification of devices capable of communicating by Li-Fi.

BACKGROUND TO THE INVENTION

The use of Li-Fi ("Light Fidelity") technology to implement a wireless communication offers many advantages: availability of the optical spectrum, absence of electromagnetic interference, cost, etc.

Furthermore, due, in particular, to the development of light-emitting diodes (LEDs) offering very substantial switching capacities and photodiodes offering very fast response times, data can be transmitted and received with Li-Fi at a speed much higher than the speed offered, for example, by Wi-Fi ("Wireless Fidelity") technology.

Li-Fi technology is therefore perfectly suitable for transmitting and receiving music, videos, Internet data, measurement data (temperature, luminosity, etc.), alarms (fire, presence of toxic vapors, etc.), for networking sensors or other types of devices, for geolocating a device indoors using Li-Fi signals transmitted by LED lamps, etc.

Many applications require the generation and assignment of a unique individual identifier of the MAC (Media Access Control) address type to electronic devices capable of communicating by Li-Fi. It is necessary, for example, to assign an identifier of this type to devices interconnected in a network and communicating with one another by Li-Fi.

OBJECT OF THE INVENTION

The object of the invention is to generate and assign a unique and individual MAC address in a simple manner and to a potentially large number of electronic devices capable of communicating by Li-Fi.

SUMMARY OF THE INVENTION

In order to achieve this object, a method for identifying a device capable of communicating by Li-Fi is proposed, the method comprising the steps of:
  generating and storing a list of first address data and a list of transmission frequencies, each associated with a first address datum;
  selecting second address data from the first address data to form an address of the MAC address type;
  transforming each second address datum into a third address datum containing the value of the transmission frequency associated with the second address datum;
  generating a global address from the third address data;
  assigning the global address to the device capable of communicating by Li-Fi;
  recording the global address in a memory module of the device capable of communicating by Li-Fi.

The method according to the invention is simple to carry out, since it suffices to transmit the global address signal to the device capable of communicating by Li-Fi in order to assign the address of the MAC address type to it.

Moreover, the selection of a certain number of second address data from a list of first address data simply provides a very large number of individual, unique and different combinations of second address data and therefore of addresses of the MAC address type.

BRIEF DESCRIPTION OF THE DRAWINGS

The invention will be better understood from a reading of the description which follows with reference to the figures of the attached drawings, in which.

DETAILED DESCRIPTION OF THE INVENTION

Figure 1:
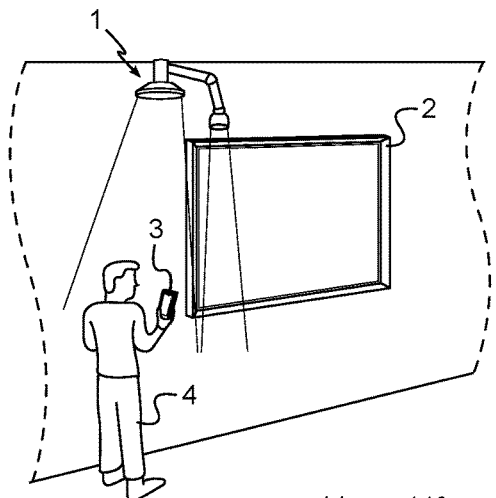
FIG. 1 shows an LED lamp used to communicate information to a mobile telephone of a visitor to a museum, the LED lamp having a MAC address generated and assigned by means of the method according to the invention.

With reference to FIG. 1, the method according to the invention is used here to identify an LED lamp 1. The identification of the LED lamp 1 consists here in generating a MAC address, in assigning the MAC address to the LED lamp 1 at the time of its manufacture, the LED lamp 1 then being capable of transmitting this MAC address to another device (for example at the request of the other device, or by transmitting the MAC address continuously until a request is received). Here, the other device is a mobile telephone 3.

The LED lamp 1 is fixed to the ceiling of a room of a museum and is positioned above a picture 2 hung on a wall of the room of the museum.

The LED lamp 1 comprises a plurality of light-emitting diodes by means of which it illuminates the surroundings of the picture, and an electronic circuit 30 including a plurality of components, some of which will be explained in the following part of this description.

The LED lamp 1 is integrated into a network including interconnected electronic devices capable of communicating with one another by Li-Fi. The interconnected electronic devices include, in particular, a plurality of LED lamps such as the LED lamp 1, and also the mobile telephone 3 carried by a visitor 4 to the museum present in the room close to the picture 2.

Apart from the lighting of the surroundings of the picture 2, the LED lamp 1 is involved in the performance of two functions.

The LED lamp 1 thus performs an information function which consists in transmitting a certain number of cultural data relating to the picture 2 (period, painter, style, etc.) by Li-Fi to the mobile telephone 3 of the visitor 4. The cultural data are thus made accessible to the visitor 4 via the mobile telephone 3.

The LED lamp 1 is also used in a function of geolocation of the mobile telephone 3. The LED lamp 1 transmits data relating to the position of the LED lamp 1 by Li-Fi to the mobile telephone 3, said data being used by the mobile telephone 3 to determine the position of the mobile telephone 3. The position of the mobile telephone 3 is thus made accessible to the visitor 4 via the mobile telephone 3.

The information and geolocation functions and, more generally, the integration of the LED lamp 1 into the network of interconnected electronic devices capable of communicating with one another by Li-Fi previously explained require the generation and assignment of a unique and individual MAC address, specific to the LED lamp 1, to the LED lamp 1 at the time of its manufacture, and require the LED lamp 1 to transmit the MAC address to the mobile telephone 3.

It will obviously be noted that every LED lamp of the network and, even beyond the network and the application explained here, every similar LED lamp in the world must have a unique and individual MAC address of this type, which can potentially represent a very large number of unique and individual MAC addresses to be generated.

The method according to the invention is used to generate these MAC addresses and to assign each MAC address to an LED lamp such as the LED lamp 1.

A MAC address 10 is formed here from a sequence of eight bytes, including an initialization byte.

In order to generate the MAC address, a list of first address data and a list of transmission frequencies, each associated with a first address datum are first generated.

Each first address datum comprises one byte. Here, the list of first address data comprises fifty first address data.

The list of first address data and the list of transmission frequencies are stored and associated in such a way that each transmission frequency has the first address datum which is associated with it for reference Thus:
the first address datum 0000 0000 is associated with the transmission frequency $f_0$;
the first address datum 0000 0001 is associated with the transmission frequency $f_1$;
the first address datum 0000 0010 is associated with the transmission frequency $f_2$;
the first address datum 0000 0011 is associated with the transmission frequency $f_3$;
etc.
the first address datum 0010 0011 is associated with the transmission frequency $f_{35}$;
etc.
the first address datum 0011 0001 is associated with the transmission frequency $f_{49}$.

It should be noted that only six bits out of the eight bits forming a byte of a first address are used here, since six bits are sufficient to form a sufficient number of different frequencies.

The transmission frequencies $f_0$ to $f_{49}$ are obtained by incrementation of a frequency step of 300 Hz from the frequency of 1.5 kHz, i.e.:
$f_0$=1.5 kHz;
$f_1$=1.8 kHz;
$f_2$=2.1 kHz;
$f_3$=2.4 kHz;
etc.
$f_{35}$=12 kHz;
etc.
$f_{49}$=15.6 kHz.

Seven second address data are then selected from the fifty first address data to which the start byte is added in order to form a MAC address. Thus,
50!/(50-7)!=503 417 376 000
possible arrangements, or the same number of individual unique MAC addresses, can be obtained.

Figure 2:
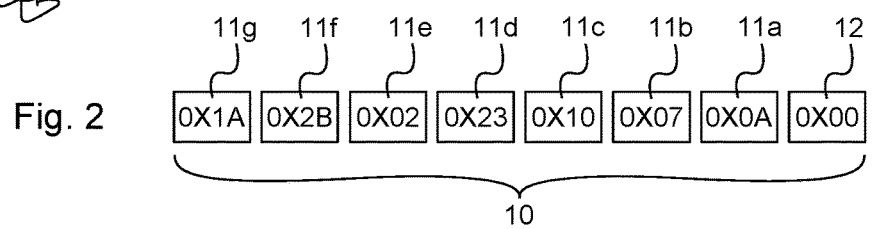
FIG. 2 shows a MAC address generated by the method according to the invention.
Figure 3:
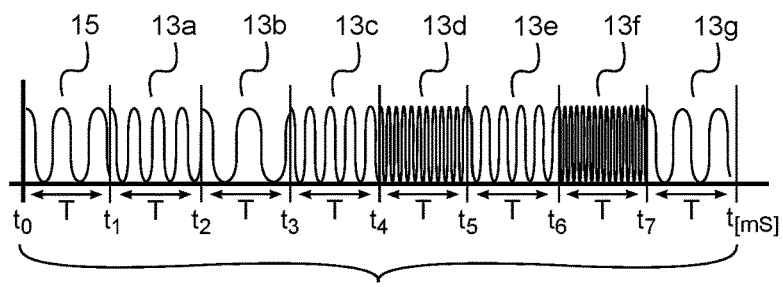
FIG. 3 shows a global address signal corresponding to the MAC address shown in FIG. 2.

Thus, the MAC address 10 shown in FIG. 2 comprises seven second address data 11a, 11b, 11c, 11d, 11e, 11f, 11g and one start byte 12. The second address data 11 are expressed in hexadecimal notation in FIG. 2:
the second address datum 11a has the value 0X0A in hexadecimal notation, or 10 in decimal notation;
the second address datum 11b has the value 0X07 in hexadecimal notation, or 7 in decimal notation;
the second address datum 11c has the value 0X10 in hexadecimal notation, or 16 in decimal notation;
the second address datum 11d has the value 0X23 in hexadecimal notation, or 35 in decimal notation;
the second address datum 11e has the value 0X02 in hexadecimal notation, or 2 in decimal notation;
the second address datum 11f has the value 0X2B in hexadecimal notation, or 43 in decimal notation;
the second address datum 11g has the value 0X1A in hexadecimal notation, or 26 in decimal notation.

Once the MAC address 10 intended for the LED lamp 1 is formed, each second address datum 11a, 11b, 11c, 11d, 11e, 11f, 11g is transformed into a third address datum containing the transmission frequency value associated with the second address datum. The second address datum 11d, which corresponds to the first address datum associated with the frequency $f_{35}$=12 kHz, is thus transformed into a third address datum containing the value "12 kHz" in binary form.

A global address which comprises a start datum corresponding to the start byte 12 and containing the value of the frequency $f_0$, and a sequence made up the succession of the third address data are then generated from the third address data.

The global address is then transmitted to the electronic circuit of the LED lamp 1. The electronic circuit acquires the global address (and therefore the MAC address 10) and records the global address and the MAC address 10 in a memory module of the electronic circuit using a "burned-in address" method. The MAC address 10 then becomes a unique and individual identifier assigned to the LED lamp 1. It should be noted here that the global address may be transmitted to the LED lamp 1 by means of a wired transmission, by Li-Fi, etc.

Figure 4:
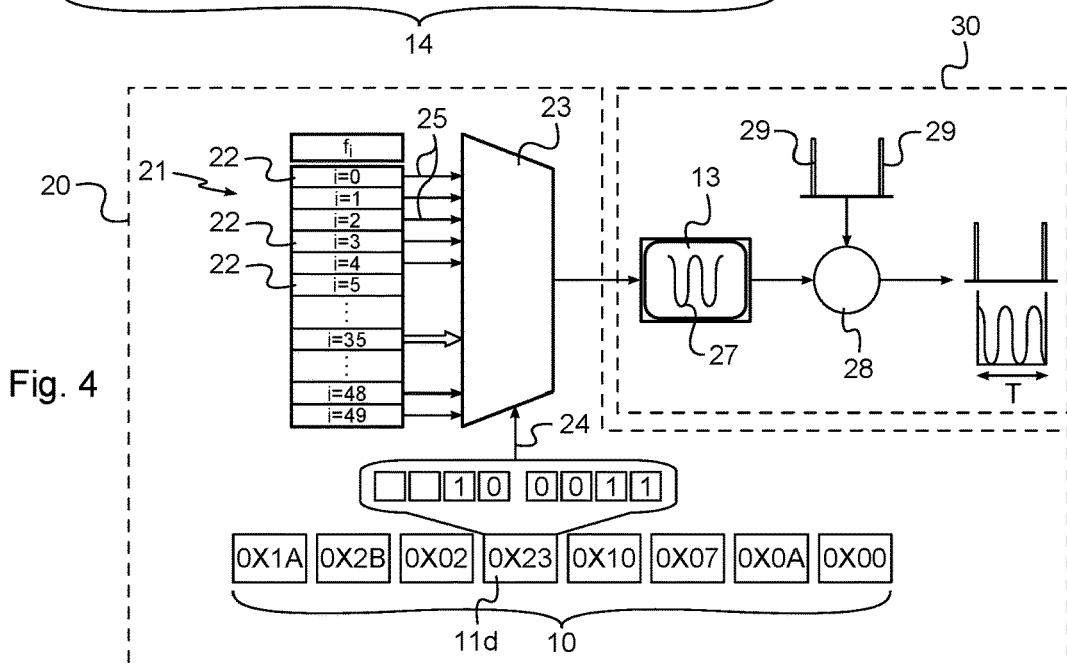
FIG. 4 is a diagram outlining the operation of the method according to the invention.

With reference to FIG. 4, a MAC address generation and assignment device 20 is used to generate the MAC address 10 and to assign the MAC address 10 to the LED lamp 1.

The MAC address generation and assignment device 20 first and foremost comprises storage means for generating and storing the list of first address data and the list of associated transmission frequencies, and selection means for selecting the second address data 11 from the first address data in such a way as to form the MAC address 10.

The storage means include a correspondence table 21 (or look-up table) in which the list of fifty first address data and associated transmission frequencies $f_i$ is stored. In the correspondence table 21, the transmission frequencies $f_i$ are each stored in a memory space 22 whose reference (or address) within the correspondence table 21 is the first address datum with which the transmission frequency $f_i$ is associated.

The selection means include a multiplexer 23 and a selector 24 controlling the multiplexer 23.

Each memory space 22 containing a transmission frequency $f_i$ is connected via a connection link 25 to the inputs of the multiplexer 23.

When a second address datum 11 is selected from the fifty first address data, the selector 24 connects to the output of the multiplexer 23 the input of the multiplexer connected to the memory space 22 having the second address datum 11 for reference and containing the transmission frequency $f_i$ associated with the second address datum 11. FIG. 4 thus shows a case where the second address datum 11*d* corresponding to the first address datum associated with the frequency $f_{35}$=12 kHz is selected.

The transmission by the LED lamp 1 of its MAC address 10 to the mobile telephone 3 will now be described.

Each third address datum is transformed into a partial address signal 13*a*, 13*b*, 13*c*, 13*d*, 13*e*, 13*f*, 13*g* of a predetermined duration T, having as its frequency the transmission frequency contained in the third address datum (and associated with the second address datum 11*a*, 11*b*, 11*c*, 11*d*, 11*e*, 11*f*, 11*g*).

The second address datum 11*d* thus corresponds to the first address datum associated with the frequency $f_{35}$=12 kHz. The third address datum associated with the second address datum 11*d* therefore contains the value of the frequency $f_{35}$=12 kHz. The partial address signal 13*d* as a function of time t is therefore as follows:

$$s(t)=A\cos(2\cdot\pi\cdot f_{35}\cdot t+\varphi) \text{ for } 0\leq t\leq T;$$

$$s(t)=0 \text{ otherwise,}$$

with $f_{35}$=12 kHz, the phase $\varphi$ being between 0 and 90° and A being the amplitude of the signal.

A global address signal 14 comprising a start signal 15 and a sequence made up the succession of the seven partial address signals 13 is generated from the seven partial address signals 13. The start signal 15 which corresponds to the start byte 12 is a signal having a duration T and a frequency $f_0$.

In order to transmit the global address signal to the mobile telephone 3, the electronic circuit 30 of the LED lamp comprises a frequency generator 27 and a synchronization unit 28 (shown in FIG. 4).

The frequency generator 27 generates the seven partial address signals 13 and the start signal 15 in order to form the global address signal 14. The synchronization unit 28 uses a pulse 29 originating from a signal generated by a clock for each partial address signal 13. The synchronization unit 28 synchronizes the start and end of the generation of the partial address signal 13 with these pulses 29, so that the partial address signal 13 is generated for a predetermined duration T.

The global address signal 14 is transmitted by Li-Fi to the mobile telephone 3 by means of a Li-Fi transmission signal. The Li-Fi transmission signal is formed by a succession of signals generated by the flashing of an light-emitting diode at the frequencies corresponding to the frequencies of the partial address signals 13.

The mobile telephone 3 is equipped with a Li-Fi receiver connected to a photodiode which detects the Li-Fi transmission signal. The mobile telephone 3 acquires the global address signal 14 and therefore the MAC address 10 of the LED lamp 1.

The invention is not limited to the particular embodiment which has just been described, but, on the contrary, covers any variant falling within the scope of the invention as defined by the claims.

It should be noted first of all that the invention is not limited in any way to the assignment of addresses of the MAC address type to LED lamps. The generated addresses of the MAC address type can be assigned to any type of device capable of communicating by Li-Fi. The method according to the invention is particularly suitable for assigning an address of the MAC address type to a device comprising a generic Li-Fi communication module intended to equip different electronic devices or equipment capable of communicating by Li-Fi. In fact, the address of the MAC address type identifying a device of this type comprising a generic Li-Fi communication module may totally depend on the application in which the device is used and may not be defined at the time of manufacture of the generic Li-Fi communication module, but only during the assembly of the device.

Although a MAC address has been cited in the description, it is obvious that the invention applies to any other type of identifier.

The structure of the MAC address described here is obviously provided merely to illustrate the invention and may be quite different (number of first and second address data, size of each address datum, etc.).

Similarly, the transmission frequencies, and equally the frequency step between the frequencies, may be different from the frequencies and the frequency step mentioned. The transmission frequencies may be between 0 and several MHz. The upper limit depends on the capacity of the internal clock of the electronic module of the lamp.

The invention claimed is:

1. A method for identifying a device capable of communicating by Li-Fi, the method comprising the steps of:
generating and storing a list of first address data and a list of transmission frequencies, each associated with a first address datum;
selecting second address data from the first address data to form an address of the MAC address type;
transforming each second address datum into a third address datum containing the value of the transmission frequency associated with the second address datum;
generating a global address from the third address data;
assigning the global address to the device capable of communicating by Li-Fi; and
recording the global address in a memory module of the device capable of communicating by Li-Fi; and
wherein the method further comprises a step during which the device capable of communicating by Li-Fi transforms each third address datum into a partial address signal of a predetermined duration having as its frequency the transmission frequency contained in the third datum, and a step during which the device capable of communicating by Li-Fi generates a global address signal comprising a sequence made up the succession of the partial address signals, and transmits the global address signal by Li-Fi to another device in such a way that the other device acquires the MAC address.

2. The method as claimed in claim 1, in which the global address comprises a start datum and a sequence made up of the succession of the third address data.

3. The method as claimed in claim 2, in which the sequence comprises seven third address data.

4. The method as claimed in claim 1, in which each first address datum comprises a one-byte word.

5. The method as claimed in claim 1, in which the transmission frequencies are between 0 Hz and several MHz.

6. The method as claimed in claim 1, in which a correspondence table is used to store the list of first address data, each associated with a transmission frequency.

7. The method as claimed in claim 1, in which a multiplexer is used to select the second address data.

8. The method as claimed in claim 1, in which the assignment of the global address to the device capable of communicating by Li-Fi is implemented by transmitting the global address by Li-Fi to the device capable of communicating by Li-Fi.

\* \* \* \* \*